(12) United States Patent
Komura

(10) Patent No.: US 7,135,895 B2
(45) Date of Patent: Nov. 14, 2006

(54) SEMICONDUCTOR DEVICE HAVING OUTPUT CIRCUIT ADAPTIVELY SUPPRESSING SSO NOISE

(75) Inventor: Kazufumi Komura, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/975,831

(22) Filed: Oct. 29, 2004

(65) Prior Publication Data

US 2005/0285655 A1    Dec. 29, 2005

(30) Foreign Application Priority Data

Jun. 28, 2004    (JP) .............................. 2004-190002

(51) Int. Cl.
 *H03K 3/00*    (2006.01)
(52) U.S. Cl. ...................... 327/108; 327/384; 327/385; 326/27; 326/28
(58) Field of Classification Search ................ 327/108, 327/384, 385; 326/21, 27, 28
See application file for complete search history.

(56) References Cited

U.S. PATENT DOCUMENTS 4,644,265 A * 2/1987 Davidson et al. ........... 714/736
5,059,822 A * 10/1991 Dukes ......................... 326/86
5,066,873 A * 11/1991 Chan et al. .................. 326/27
5,362,996 A * 11/1994 Yizraeli ....................... 326/27
5,473,263 A * 12/1995 Mahmood .................... 326/27
6,201,431 B1 * 3/2001 Allen et al. ................. 327/379
6,366,114 B1 * 4/2002 Liu et al. ..................... 326/27
6,788,098 B1 * 9/2004 Alani et al. .................. 326/16
6,856,179 B1 * 2/2005 Kaushik et al. ............. 327/112

FOREIGN PATENT DOCUMENTS

JP    9-93108    4/1997

* cited by examiner

Primary Examiner—Kenneth B. Wells
(74) Attorney, Agent, or Firm—Arent Fox PLLC

(57) ABSTRACT

A semiconductor device capable of detecting and suppressing SSO noise after the semiconductor device has been mounted on a board. The semiconductor device includes an output circuit for outputting parallel output signals in accordance with a clock signal, an SSO noise generation circuit for activating the output circuit to generate SSO noise, and a clock control circuit for detecting the SSO noise and adjusting phase of the clock signal to suppress the SSO noise.

19 Claims, 13 Drawing Sheets

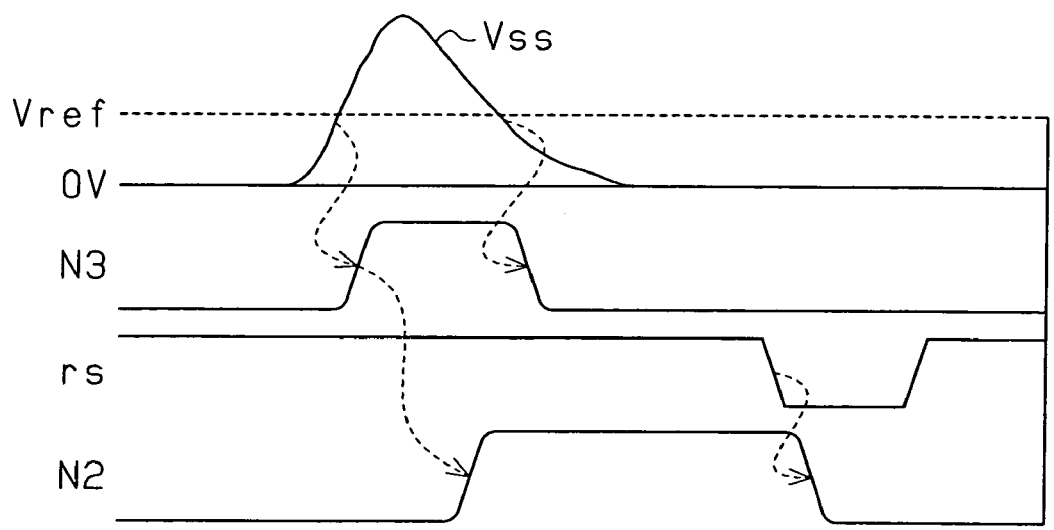

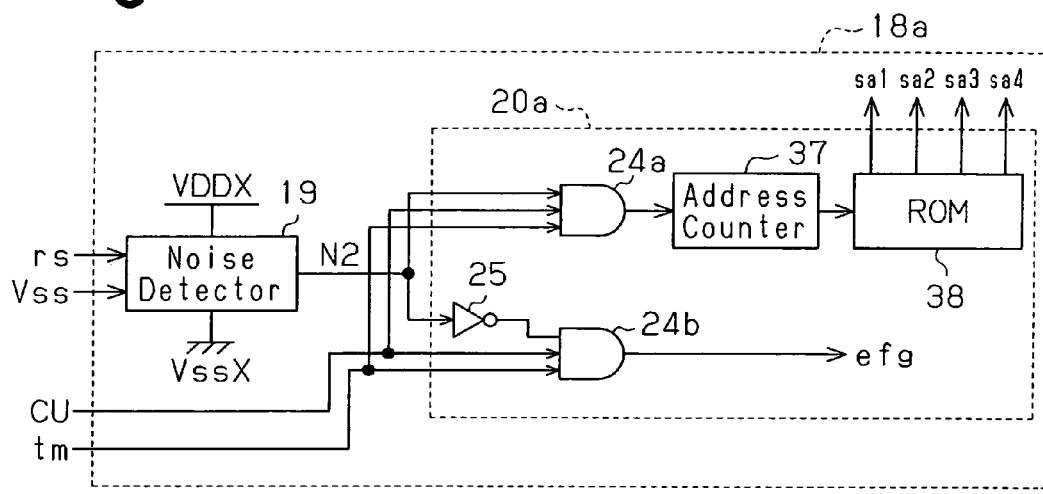

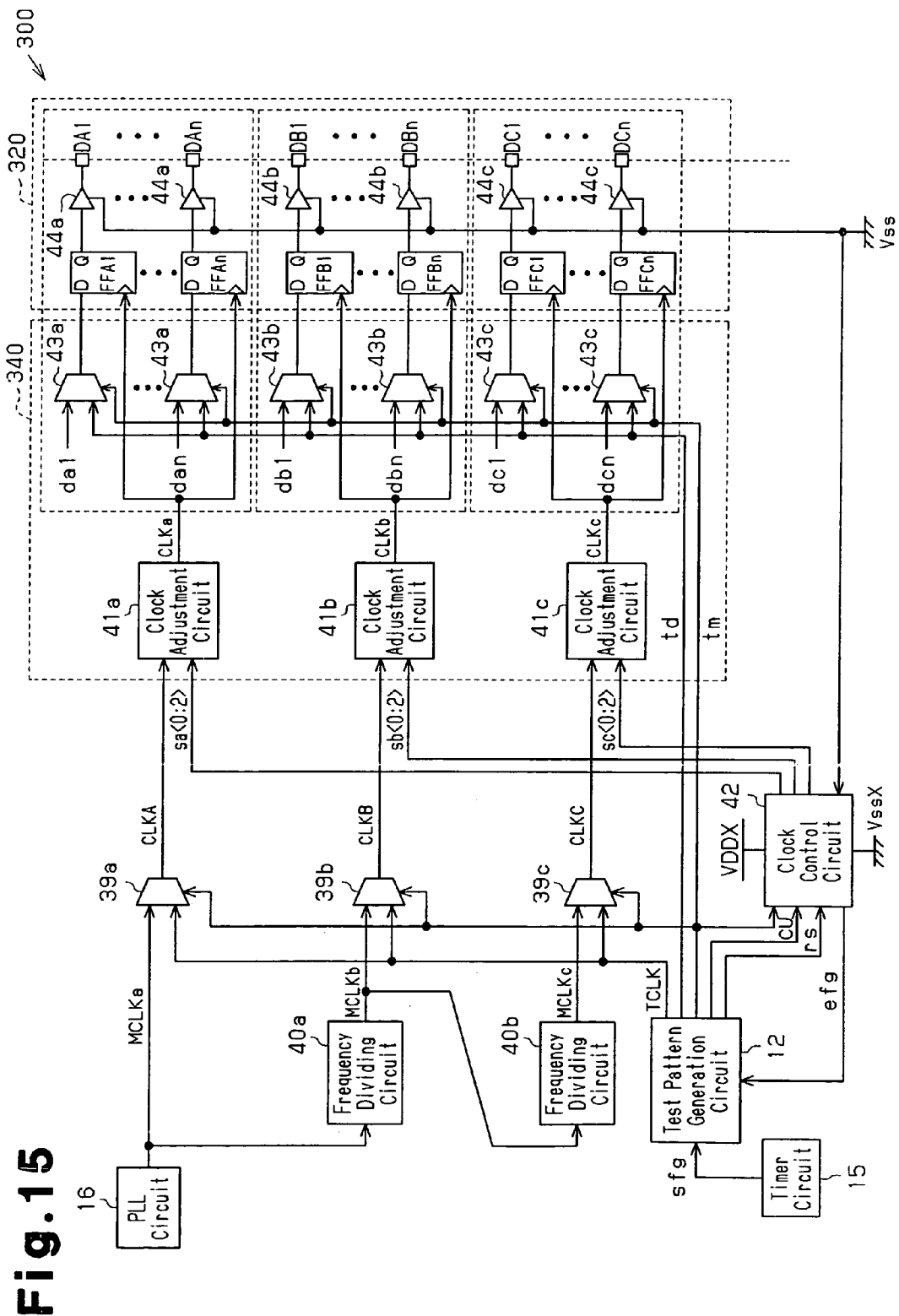

SEMICONDUCTOR DEVICE HAVING OUTPUT CIRCUIT ADAPTIVELY SUPPRESSING SSO NOISE

CROSS-REFERENCE TO RELATED APPLICATIONS

This application is based upon and claims the benefit of priority from prior Japanese Patent Application No. 2004-190002, filed on Jun. 28, 2004, the entire contents of which are incorporated herein by reference.

BACKGROUND OF THE INVENTION

The present invention relates to a semiconductor device, and more particularly, to a semiconductor device having an output circuit for providing a plurality of signals from an internal circuit to output pads in parallel.

In recent years, as the number of output pins in a large-scale LSI has increased, a plurality of output buffer circuits are used to provide an output signal from an internal circuit to an output pin via an output pad. Each buffer circuit has a relatively large transistor for rapidly driving large capacitance loads, such as an external semiconductor chip and wirings on a packaging substrate. When the buffer circuits operate simultaneously, the simultaneous switching operation of the transistors in the output buffer circuits tends to generate power supply noise. Therefore, it is required that such power supply noise be suppressed.

FIG. 1 is a schematic block diagram showing an output circuit 100 mounted on a conventional semiconductor device. Each of a plurality of flip-flop circuits 1a and 1b receives data da1-dan and db1-dbn from internal circuits, and provides the data da1-dan and db1-dbn to a corresponding one of buffer circuits 2, in response to the rise of a corresponding clock signal CLKA or CLKB. The buffer circuits 2 amplify the data da1-dan and db1-dbn and provide output signals DA1 to DAn and DB1 to DBn to corresponding output pads 3.

The clock signal CLKA is generated by frequency-dividing a reference clock signal CLKS generated by a PLL circuit 4 with a frequency dividing circuit 5a. The clock signal CLKb is generated by frequency-dividing the clock signal CLKA from the frequency dividing circuit 5a into two with a frequency dividing circuit 5b. Accordingly, the flip-flop circuits 1a and the flip-flop circuits 1b operate on different clock signals.

In the output circuit 100, as shown in FIG. 2, a potential of a low potential power supply Vss temporarily rises to generate noise N when H level output signals DA1 to DAn and DB1 to DBn, which are being output from the buffer circuits 2, drop to L levels synchronously in response to the rise of the clock signals CLKA and CLKB. This noise N is referred to as "simultaneous switching output (SSO)" noise. If the SSO noise exceeds a tolerable value, it may cause erroneous functioning of other circuits commonly using the low potential power supply Vss.

Japanese Patent Laid-Open Publication No. 09-93108 discloses a technique for suppressing SSO noise by shifting the phases of clock signals provided to a plurality of output buffer circuits.

SUMMARY OF THE INVENTION

In Japanese Patent Laid-Open Publication No. 09-93108, the phase difference between the clock signals is a fixed value set in the design stage. It is thus impossible to suppress SSO noise generated by various factors, which are unpredictable at the design stage, after a semiconductor device has been mounted.

The present invention provides a semiconductor device capable of suppressing SSO noise after the semiconductor device has been mounted.

One aspect of the present invention provides a semiconductor device including an output circuit for outputting a plurality of output signals in parallel in accordance with a clock signal. A noise generation circuit, connected to the output circuit, activates the output circuit to generate noise. A clock control circuit detects the noise and adjusts phase of the clock signal so as to suppress the noise.

A further aspect of the present invention is a semiconductor device including an output circuit for outputting a plurality of output signals in parallel according to a clock signal. A clock control circuit, connected to the output circuit, detects noise generated due to operation of the output circuit and adjusts phase of the clock signal so as to suppress the noise.

Another aspect of the present invention is a semiconductor device including a plurality of flip-flop circuits for generating a plurality of output signals in accordance with a plurality of clock signals, respectively. The semiconductor device further includes a plurality of buffer circuits, connected to the plurality of flip-flop circuits, for receiving the output signals from the flip-flop circuits and outputting the output signals, respectively, a plurality of selectors connected the plurality of flip-flop circuits for supplying the flip-flop circuits with selector output signals, respectively, a plurality of clock adjustment circuits connected to the plurality of flip-flop circuits, wherein each of the clock adjustment circuits adjusts phase of the corresponding clock signal in accordance with an adjustment signal and providing the adjusted clock signal to an associated one of the flip-flop circuits, and a clock control circuit connected to the clock adjustment circuits. The clock circuit detects noise that is produced when the buffer circuits function, generates a clock adjustment signal for adjusting the phase of the clock signals to suppress the noise, and provides the clock adjustment signal to the clock adjustment circuits.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a waveform diagram showing the operation of the noise detector in FIG. 7;

FIG. 9 is an explanatory diagram showing the operation of a counter of the clock control circuit in FIG. 4;

FIG. 13 is a schematic block diagram showing a clock control circuit of a semiconductor device according to a second embodiment of the present invention;

FIG. 14 is an explanatory diagram showing data stored in a ROM of the clock control circuit of the semiconductor device in FIG. 13;

FIG. 15 is a schematic block diagram showing a semiconductor device according to a third embodiment of the present invention;

DETAILED DESCRIPTION OF THE PREFERRED EMBODIMENTS

Figure 1:
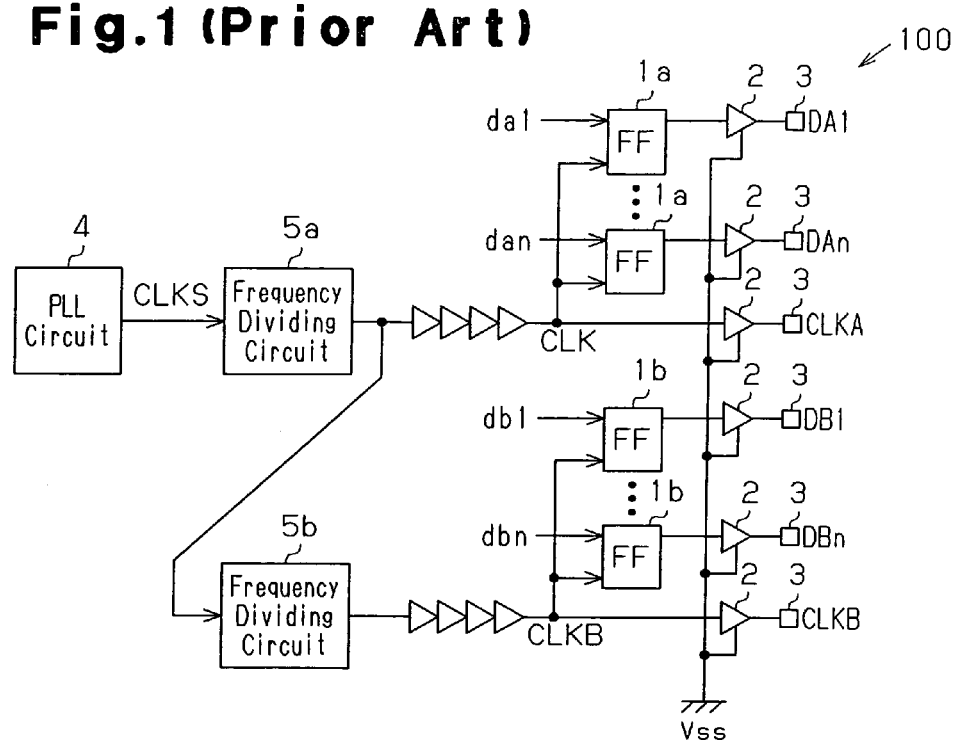
FIG. 1 is a schematic block diagram showing a conventional output circuit.
Figure 2:
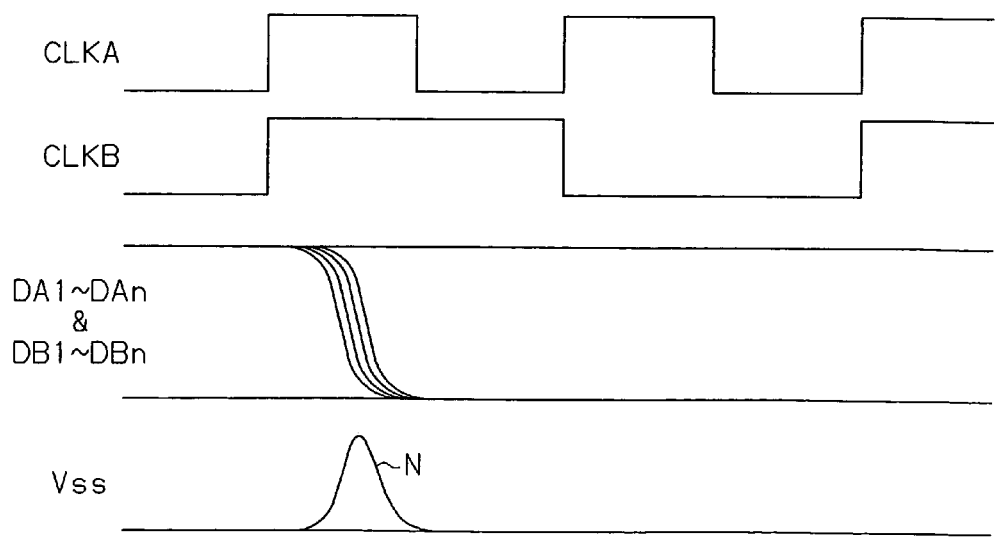
FIG. 2 is a waveform diagram showing the operation of the output circuit of FIG. 1.
Figure 3:
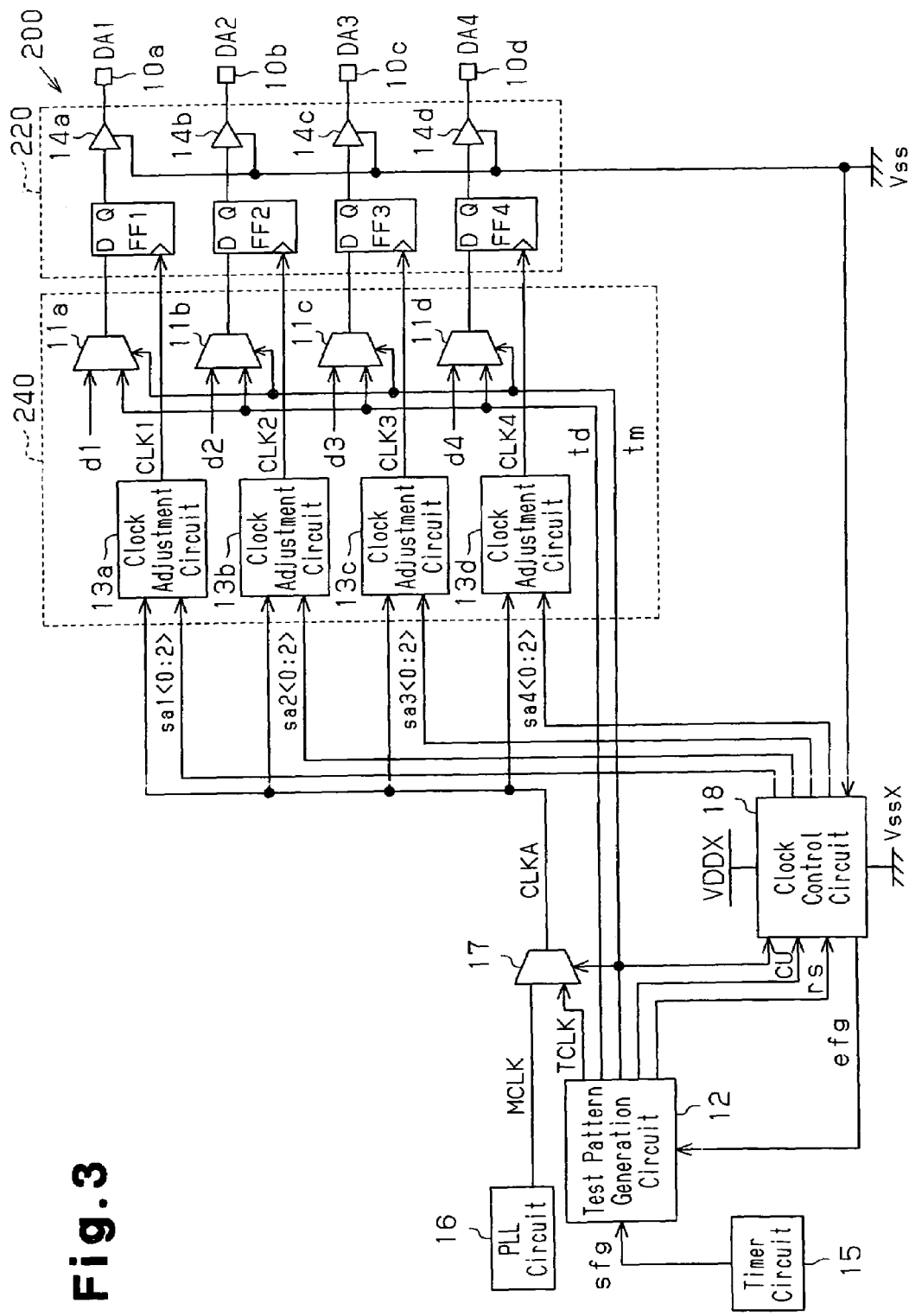
FIG. 3 is a schematic block diagram of a semiconductor device according to a first embodiment of the present invention.

FIG. 3 is a schematic block diagram showing a semiconductor device 200 according to a first embodiment of the present invention. The semiconductor device 200 has an output circuit 220 generating four output signals DA1, DA2, DA3, and DA4 from four output pads 10a, 10b, 10c, and 10d, respectively. Further, the semiconductor device 200 has four selectors 11a, 11b, 11c, and 11d, four flip-flop circuits FF1, FF2, FF3, and FF4, four clock adjustment circuits 13a, 13b, 13c, and 13d, four buffer circuits 14a, 14b, 14c, and 14d, a test pattern generation circuit 12, a timer circuit 15, a PLL circuit 16, a selector 17, and a clock control circuit 18.

The selectors 11a to 11d are provided with output data d1 to d4, respectively, from internal circuits (not shown) and a test data signal td from the test pattern generation circuit 12. The selectors 11a to 11d are further provided with a test mode signal tm from the test pattern generation circuit 12. If the test mode signal tm rises to H level during a test mode, for example, the selectors 11a to 11d each select the test data signal td. If the test mode signal tm drops to L level during normal mode, the selectors 11a to 11d select the corresponding output data d1 to d4.

The output signals from the selectors 11a to 11d are provided to the flip-flop circuits FF1 to FF4, respectively. The flip-flop circuits FF1 to FF4 are provided with clock signals CLK1 to CLK4 from the clock adjustment circuits 13a to 13d, respectively. The flip-flop circuits FF1 to FF4 latch output signals of the selectors 11a to 11d, for example, in response to the rise of the clock signals CLK1 to CLK4, respectively, and provide an output signal Q to the respective corresponding buffer circuits 14a to 14d.

The buffer circuits 14a to 14d each buffer the corresponding output signal Q and generate output signals DA1 to DA4, respectively.

The test pattern generation circuit 12 starts its operation in response to an adjustment start flag sfg provided from the timer circuit 15. The timer circuit 15 provides an adjustment start flag sfg to the test pattern generation circuit 12 after a predetermined time has elapsed from when the semiconductor device 200 is activated, that is to say after the operation of the PLL circuit 16 has been stabilized as the result of a power-up sequence.

In response to the adjustment start flag sfg, the test pattern generation circuit 12 provides a test clock signal TCLK to the selector 17, a test data signal td to the selectors 11a to 11d, and a test mode signal tm to the selectors 11a to 11d and the selector 17. The test pattern generation circuit 12 also provides a test mode signal tm, a count up signal cu and a reset signal rs to the clock control circuit 18 in response to the adjustment start flag sfg.

The PLL circuit 16, when activated, provides a main clock signal MCLK to the selector 17. The selector 17 selects a test clock signal TCLK when provided with a test mode signal tm and selects the main clock signal MCLK when not provided with a test mode signal tm. The test clock signal TCLK or main clock signal MCLK is provided to the clock adjustment circuits 13a to 13d as an operation clock signal CLKA.

The clock control circuit 18 is connected to a high potential power supply VDDX and a low potential power supply VssX for noise detection. The high potential power supply VDDX and low potential power supply VssX are connected to a power supply pad, which is separated from a power supply pad for power supplies VDD and Vss that are connected to other circuits mounted on a common substrate. This prevents the high potential power supply VDDX and low potential power supply VssX from being affected by the power supply noise caused by the operation of other circuits.

Figure 4:
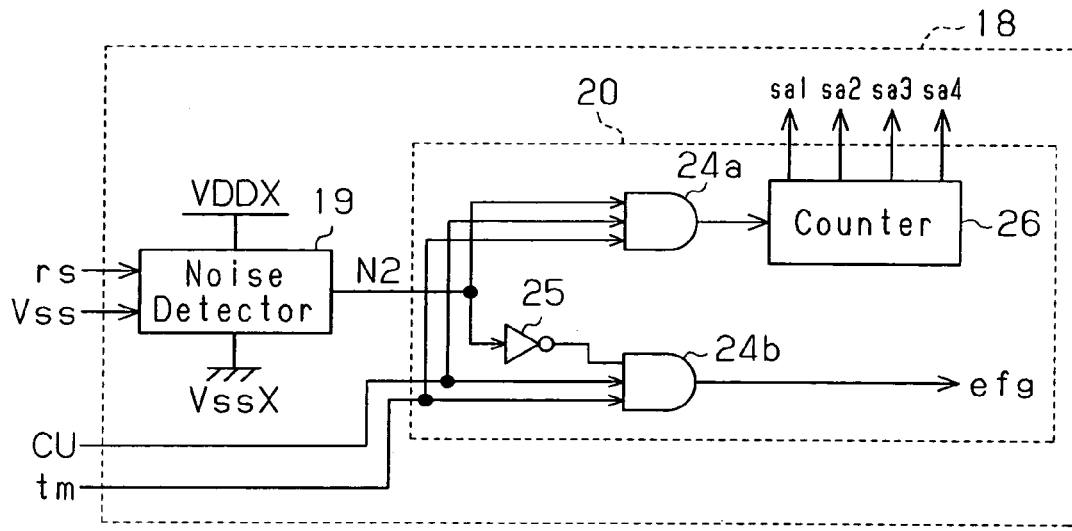
FIG. 4 is a schematic block diagram showing a clock control circuit of the semiconductor device shown in FIG. 3.

The clock control circuit 18 will now be described with reference to FIGS. 4 and 5. As shown in FIG. 4, the clock control circuit 18 includes a noise detector 19 and a clock adjustment signal generator 20.

Figure 5:
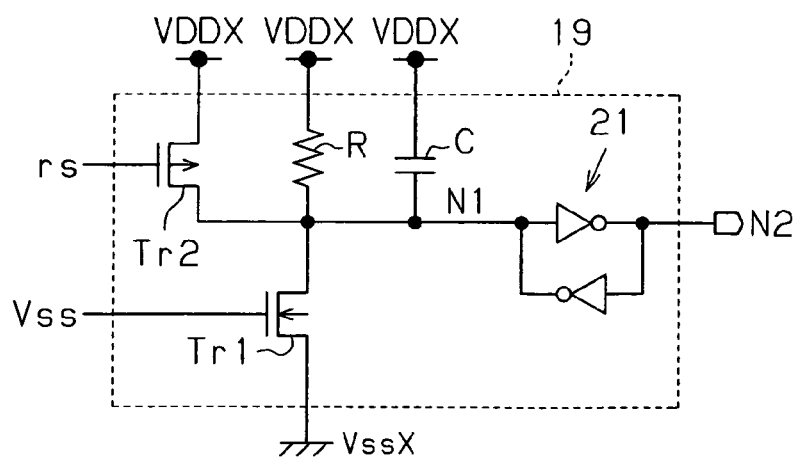
FIG. 5 is a schematic circuit diagram showing a noise detector of the clock control circuit in FIG. 4.

FIG. 5 shows an example of the noise detector 19. The gate of an n-channel MOS transistor Tr1 is connected to the normal low potential power supply Vss, and the source is connected to the noise detection low potential power supply VssX.

The drain of the transistor Tr1 is connected to the high potential power supply VDDX via a resistor R having a relatively high resistance value, and the resistor R is connected to a P-channel MOS transistor Tr2 and a capacitance C in parallel. A reset signal rs is provided to the gate of the transistor Tr2, and the drain of the transistor Tr1, that is, node N1, is connected to the input terminal of a latch circuit 21. The output terminal of the latch circuit 21, that is, node N2, provides an output signal to a clock adjustment signal generator 20.

Figure 6:
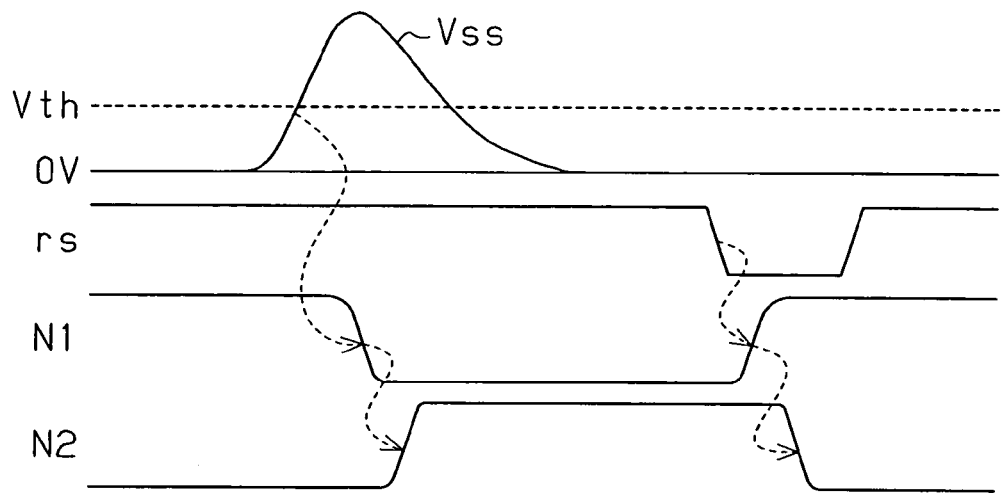
FIG. 6 is a waveform diagram showing the operation of the noise detector in FIG. 5.

Next, the operation of the noise detector 19 will be described with reference to FIG. 6. When an L level reset signal rs is supplied to the gate of the transistor Tr2, the transistor Tr2 is turned on and the node N1 is set substantially to the level of the power supply VDDX.

When SSO noise is produced after the rise of the reset signal rs from L level to H level, the potential of the power supply Vss rises. When the potential difference between the resulting potential of the power supply Vss and the potential of the noise detecting power supply VssX increases beyond a threshold value Vth of the transistor Tr1, the transistor Tr1 is turned on and the potential of the node N1 drops substantially to the level of the power supply VssX.

When this happens, the node N2 is changed from L level to H level by the operation of the latch circuit 21. This H level state is maintained until the reset signal rs is again set to L level, and the node N2 returns to L level when the reset signal rs drops to L level.

The noise detector 19 operates in this manner so that the node N2 is set to H level every time SSO noise is produced at the power supply Vss.

The resistor R functions to prevent the potential of the node N1 from being decreased by leakage current of the transistor Tr1. The capacitance C functions to control generation of noise at the node N1 when the transistor Tr1 or transistor Tr2 is turned on.

Figure 7:
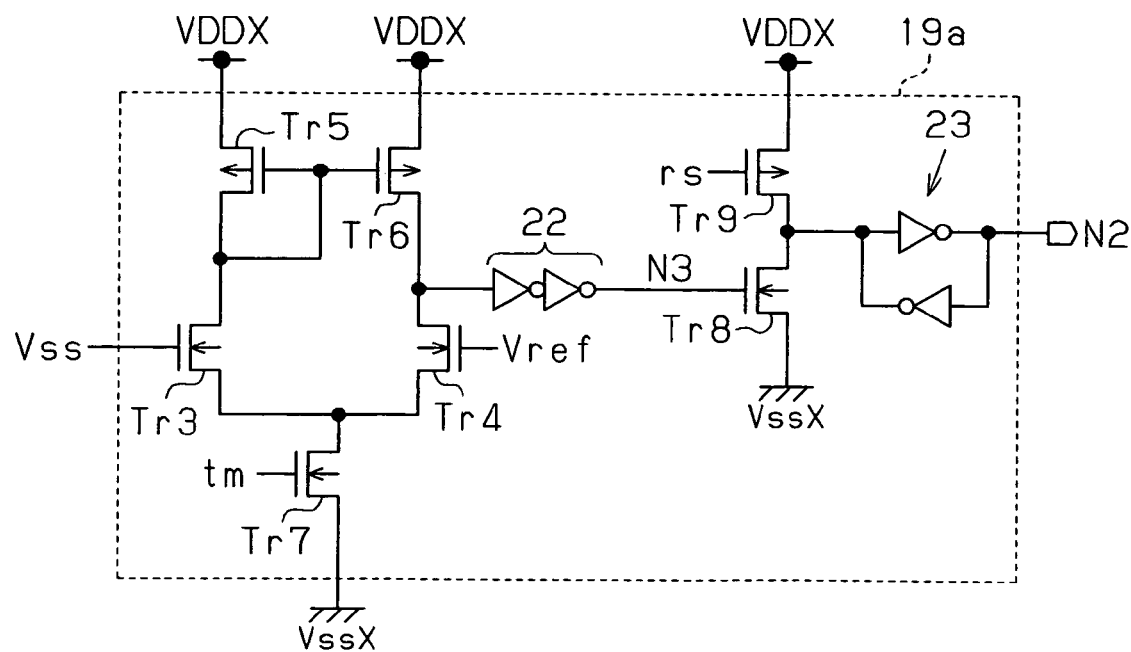
FIG. 7 is a schematic circuit diagram showing another noise detector of the clock control circuit in FIG. 4.

FIG. 7 shows another example of a noise detector 19a. The noise detector 19a is configured to detect SSO noise by the use of a differential circuit.

The gates of N-channel MOS transistors Tr3 and Tr4 configuring the differential circuit are supplied with a power supply Vss and a reference voltage Vref, respectively. The drain of the transistor Tr3 is connected with the gates of P-channel MOS transistors Tr5 and Tr6 and to the drain of the transistor Tr5. The sources of the transistors Tr5 and Tr6 are connected to the power supply VDDX. The drain of the transistor Tr4 is connected to the drain of the transistor Tr6.

The sources of the transistors Tr3 and Tr4 are connected to the power supply VssX via an N-channel MOS transistor Tr7. The gate of the transistor Tr7 is provided with a test mode signal tm. Output voltage of the differential circuit is supplied from the drains of the transistors Tr4 and Tr6 to the node N3 via a two-stage inverter circuit 22.

When the test mode signal tm rises to H level, the transistor Tr7 is turned on to activate the differential circuit. When the voltage of the power supply Vss is higher than the reference voltage Vref (that is, when SSO noise is produced at the power supply Vss), the node N3 is set to H level. When the voltage of the power supply Vss is lower than the reference voltage Vref (that is, when SSO noise is not generated at the power supply Vss), the node N3 is set to L level.

The node N3 is connected to the gate of an N-channel MOS transistor Tr8. The source of the transistor Tr8 is connected to the power supply VssX, and the drain is connected to the power supply VDDX via a P-channel MOS transistor Tr9. The gate of the transistor Tr9 is provided with the reset signal rs.

The drains of the transistors Tr8 and Tr9 are connected to the input terminal of a latch circuit 23 and an output signal is provided from the output terminal of the latch circuit 23, that is, node N2, to the clock adjustment signal generator 20.

Operation of the noise detector 19 configured in this manner will now be described with reference to FIG. 8. When an L level reset signal rs is provided to the gate of the transistor Tr9, the transistor Tr9 is turned on and the node N2 is reset to L level.

If SSO noise is produced after the rise of the reset signal rs from L level to H level, the potential of the power supply Vss increases. When the increased potential exceeds the reference voltage Vref, the drain current of the transistor Tr3 is increased, and the drain current of the transistors Tr5 and Tr6 is increased. The drain potential of the transistors Tr4 and Tr6 is thereby increased and the node N3 is set to H level. Then, the transistor Tr8 is turned on and the supply voltage of the latch circuit 23 drops to L level, whereby the node N2 is set to H level. The H level state of the node N2 is maintained until the reset signal rs is supplied again, and when the reset signal rs drops to L level, the node N2 returns to L level.

The noise detector 19a operates in the manner described above so that the node N2 is set to H level when SSO noise is produced at the power supply Vss.

The noise detector 19a shown in FIG. 7 sets a threshold value for detecting SSO noise to a certain value in accordance with the reference voltage Vref.

Next, the clock adjustment signal generator 20 will be described with reference to FIG. 4. An output signal supplied from the node N2 of the noise detector 19 is provided to an AND circuit 24a and to an AND circuit 24b via an inverter circuit 25.

The AND circuits 24a and 24b are both provided with the count up signal cu and the test mode signal tm from the test pattern generation circuit 12.

When the node N2 is set to H level and the count up signal cu and test mode signal tm rise to H level, the output signal of the AND circuit 24a rises to H level. When the node N2 is set to L level and the count up signal cu and test mode signal tm rise to H level, the output signal of the AND circuit 24b rises to H level.

The output signal of the AND circuit 24a is provided to a 12-bit counter 26. As seen from FIG. 9, the counter 26 sequentially performs a count up operation every time the output signal of the AND circuit 24a rises to H level. The counter 26 also generates clock adjustment signals sa1 to sa4, each having three bits from the lower rank bit to the higher rank bit. The clock adjustment signals sa1 to sa4 are provided to the clock adjustment circuits 13a to 13d, respectively, as shown in FIG. 3.

The output signal of the AND circuit 24b is provided to the test pattern generation circuit 12 as an adjustment end flag efg. The test pattern generation circuit 12 stops outputting signals when the adjustment end flag efg rises to H level.

Figure 10:
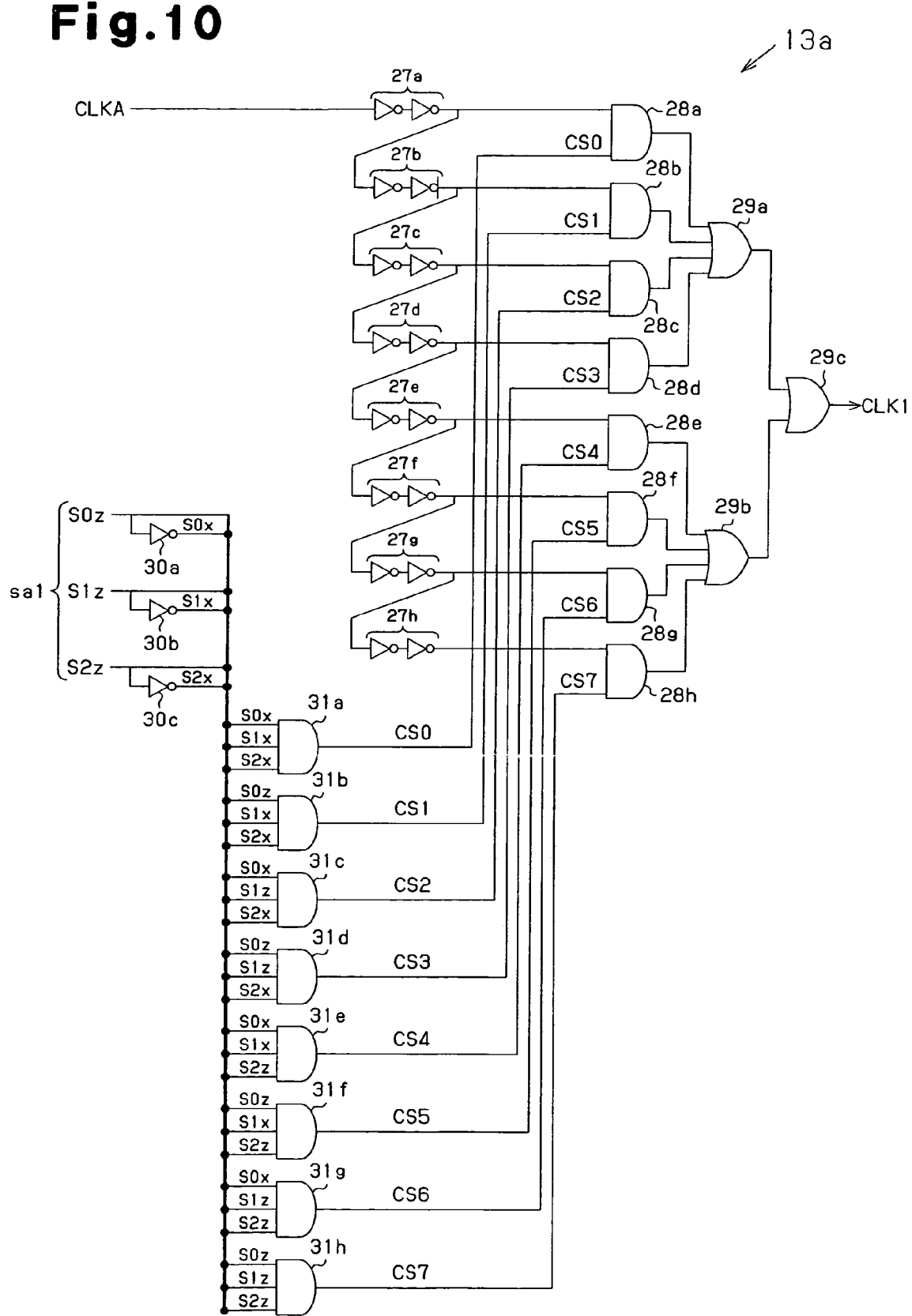
FIG. 10 is a schematic circuit diagram showing a clock adjustment circuit of the semiconductor device in FIG. 3.

The clock adjustment circuits 13a to 13d will now be described with reference to FIG. 10. Since the clock adjustment circuits 13a to 13d have an identical configuration, only the clock adjustment circuit 13a will be described.

An operation clock signal CLKA is provided to an AND circuit 28a via a two-stage inverter circuit 27a. An output signal of the inverter circuit 27a is provided to an AND circuit 28b via a two-stage inverter circuit 27b. An output signal of the inverter circuit 27b is provided to an AND circuit 28c via a two-stage inverter circuit 27c. An output signal of the inverter circuit 27c is provided to an AND circuit 28d via a two-stage inverter circuit 27d. An output signal of the inverter circuit 27d is provided to an AND circuit 28e via a two-stage inverter circuit 27e. Further, an output signal of the inverter circuit 27e is provided to an AND circuit 28f via a two-stage inverter circuit 27f. An output signal of the inverter circuit 27f is provided to an AND circuit 28g via a two-stage inverter circuit 27g. An output signal of the inverter circuit 27g is provided to an AND circuit 28h via a two-stage inverter circuit 27h.

A clock adjustment signal sa1 consists of 3-bit signals s0z to s2z. Inverter circuits 30a to 30c invert the signals s0z to s2z, respectively, to generate inverted signals s0x to s2x. Eight different combinations of signals, configured by selecting three signals from the signals s0z to s2z and s0x to s2x, are provided to the AND circuits 31a to 31h, respectively.

The eight different combinations of signals are combined such that only one of them is configured by only H level signals. Thus, only one of output signals cs0 to cs7 of the AND circuits 31a to 31h is selectively set to H level.

The output signals cs0 to cs7 of the AND circuits 31a to 31h are provided to AND circuits 28a to 28h, respectively. Therefore, one of the AND circuits 28a to 28h is selectively activated by the H level output signal.

Output signals of the AND circuits 28a to 28d are provided to an OR circuit 29a, while output signals of the AND circuits 28e to 28h are provided to an OR circuit 29b. Output signals of the OR circuits 29a and 29b are output to an OR circuit 29c, and a clock signal CLK1 is output from the OR circuit 29c.

In the clock adjustment circuit 13a, as described above, the AND circuits 31a to 31h set one of the output signals cs0 to cs7 to H level according to the 3-bit clock adjustment signal sa1, the AND circuits 28a to 28h select on of the output signals of the inverter circuits 27a to 27h according to the output signals cs0 to cs7, and the clock signal CLK1 is output from the OR circuit 29c. Accordingly, one of eight different signals generated by sequentially delaying the operation clock signal CLKA with the inverter circuits 27a to 27h is selected. The delayed operation clock signal is output as the clock signal CLK1. The inverter circuits 27a to 27h configure a clock signal generator. The AND circuits 28a to 28h and AND circuits 31a to 31h configure a clock signal selector.

Figure 12:
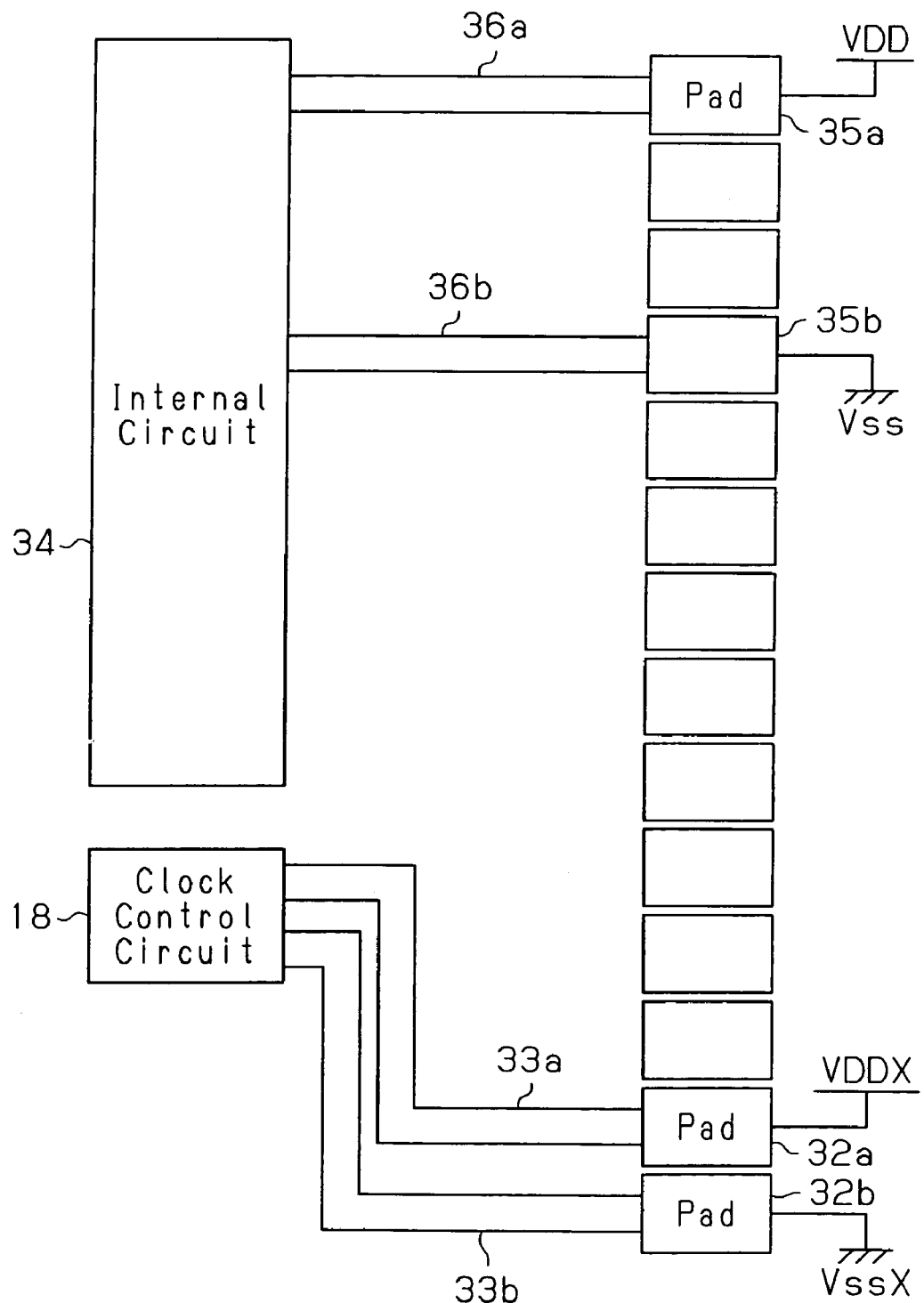
FIG. 12 is a layout diagram of power supply lines of the semiconductor device in FIG. 3.

FIG. 12 illustrates the configuration of the supply of power from the noise detecting power supplies VDDX and VssX to the clock control circuit 18. The clock control circuit 18 is connected to the noise detecting power supply VDDX via an exclusive pad 32a and an exclusive power supply line 33a, and connected to the noise detecting power supply VssX via an exclusive pad 32b and an exclusive power supply line 33b.

An internal circuit 34 other than the clock control circuit 18 is connected to the power supply VDD via a pad 35a and a power supply line 36a, and connected to the power supply Vss via a pad 35b and a power supply line 36b.

Figure 11:
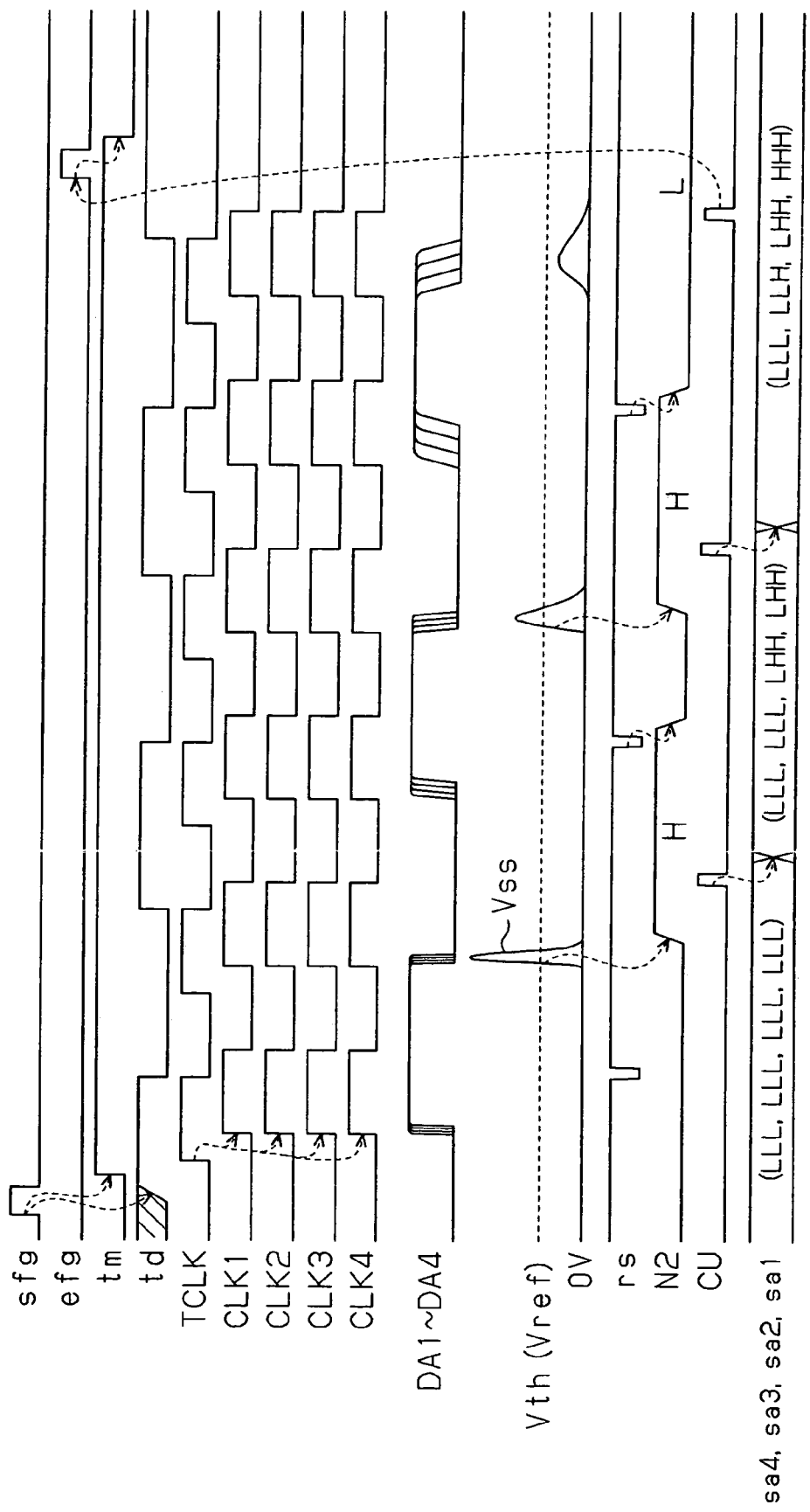
FIG. 11 is a waveform diagram showing a clock adjustment operation of the semiconductor device in FIG. 3.

Next, a clock adjustment operation of the semiconductor device 200 during a test mode will be described with reference to FIG. 11.

An adjustment start flag sfg is provided from the timer circuit 15 to the test pattern generation circuit 12 when a predetermined time has elapsed from activation of the semiconductor device 200. The test pattern generation circuit 12 then outputs a test clock signal TCLK to raise the test data signal td to H level and raise the test mode signal tm to H level. The test data signal td is a signal that switches between H level and L level at a cycle that is two times longer than the cycle of the test clock signal TCLK.

The selectors 11a to 11d select the test data signal td in response to the test mode signal tm and provide the test data signal td to the respective corresponding flip-flop circuits FF1 to FF4.

The selector 17 selects the test clock signal TCLK in response to the test mode signal tm and provides the test clock signal TCLK to the clock adjustment circuits 13a to 13d as an operation clock signal CLKA.

The clock control circuit 18 outputs clock adjustment signals sa1 to sa4, all the bits of which have been set to an L level initial value, to set the clock signals CLK1 to CLK4 output from the clock adjustment circuits 13a to 13d at the same phase. The test data signal td is held by the flip-flop circuits FF1 to FF4 at the first time the clock signals CLK1 to CLK4 rise, and H level output signals DA1 to DA4 are output from the buffer circuits 14a to 14d, respectively.

Subsequently, when the clock signals CLK1 to CLK4 rise with the test data signal td held at L level, the output signals DA1 to DA4 drop to L level substantially synchronously. Then, electric current suddenly flows from the buffer circuits 14a to 14d to the power supply Vss. Thus, SSO noise is produced at the power supply Vss. Accordingly, the selectors 11a to 11d, which provide the test data signal td to the flip-flop circuits FF1 to FF4, and the clock adjustment circuits 13a to 13d, which provide the clock signals CLK1 to CLK4 of the same phase to the flip-flop circuits FF1 to FF4, operate as an SSO noise generation circuit 240.

When the SSO noise potential exceeds the threshold value of the noise detector 19, the node N2 of the noise detector 19 is set to H level. When a count up signal cu is provided from the test pattern generation circuit 12 to the clock control circuit 18 with the node N2 set to H level, the output signal of the AND circuit 24a of the clock adjustment signal generator 20 rises to H level, and the counter 26 starts the count up operation.

Then, the lowermost rank bit of the clock adjustment signal sa1 rises to H level, and the clock signal CLK1 provided from the clock adjustment circuit 13a is delayed by a period of time corresponding to the operation time of two stages of inverter circuits in comparison with the clock signals CLK2 to CLK4 provided from the clock adjustment circuits 13b to 13d, respectively.

Then, an L level reset signal rs is provided from the test pattern generation circuit 12 to the clock control circuit 18, and the node N2 of the noise detector 19 is reset to L level. Subsequently, when the output signals DA1 to DA4 drop to L level according to the clock signals CLK1 to CLK4 based on the operation clock signal CLKA, SSO noise occurs at the power supply Vss, and when the SSO noise potential exceeds the threshold value, the counter 26 is further counted up.

In this manner, the phases of the clock signals CLK1 to CLK4 are adjusted sequentially until the potential of SSO noise produced at the power supply Vss becomes lower than the threshold value. When the SSO noise potential becomes lower than the threshold value, the node N2 of the noise detector 19 of the clock control circuit 18 is maintained at L level, and when a H level count up signal cu is provided in the L level state, an H level adjustment end flag efg is provided from the AND circuit 24b to the test pattern generation circuit 12.

The test pattern generation circuit 12 lowers the test mode signal tm to L level in response to the H level adjustment end flag efg to end the test mode operation.

After the end of the test mode operation, the count value of the counter 26 remains unchanged. A main clock signal MCLK provided from the PLL circuit 16 is then selected by the selector 17, and the main clock signal MCLK is provided to the clock adjustment circuits 13a to 13d as an operation clock signal CLKA. Further, the clock signals CLK1 to CLK4 are generated according to the count value of the counter 26. Thus, in the normal mode, the SSO noise produced at the power supply Vss is suppressed below the threshold value by the clock signals CLK1 to CLK4, the phases of which have been adjusted.

The semiconductor device 200 according to the first embodiment has the advantages described below.

(1) The semiconductor device 200 detects SSO noise by operating the output circuit 220 mounted on the substrate in the test mode.

(2) The semiconductor device 200 detects SSO noise by operating the output circuit 220 mounted on the substrate in the test mode and automatically adjusts the phases of the output signals DA1 to DA4 so that the SSO noise is suppressed to a tolerable value or less.

(3) When activated, the test pattern generation circuit 12, the clock control circuit 18, and the clock adjustment circuits 13a to 13d function to automatically adjust the phases of the output signals DA1 to DA4.

(4) The phases of the output signals DA1 to DA4 are adjusted sequentially by the clock adjustment circuits 13a to 13d in the buffer circuits 14a to 14d, which provide the output signals DA1 to DA4. Thus, the optimal phase of the output signals DA1 to DA4 is easily selected to suppress the SSO noise to a tolerable value or less.

(5) The counter 26 performs the count up operation every time the noise detector 19 of the clock control circuit 18 detects SSO noise when the output signals DA1 to DA4 drop to L level. The clock signals CLK1 to CLK4 output from the clock adjustment circuits 13a to 13d are sequentially adjusted based on the count value of the counter. Accordingly, the phases of the output signals DA1 to DA4 are optimally set.

(6) The noise detector 19 of the clock control circuit 18 is connected to the power supply VssX that is independent from power supplies for other circuits on the substrate including the output circuit 220. This ensures detection of SSO noise produced at the power supply Vss, which is connected to the output circuit 220, with the noise detector 19.

FIG. 13 is a schematic block diagram showing a clock control circuit 18a of a semiconductor device according a second embodiment of the present invention. The clock control circuit 18a of the second embodiment includes a clock adjustment signal generator 20a that is a partial modification of the clock adjustment signal generator 20 of the first embodiment.

The noise detector 19, the AND circuits 24a and 24b, and the inverter circuit 25 are identical to their counterparts of the first embodiment shown in FIG. 4.

An output signal of the AND circuit 24a is provided to an address counter 37, which is a 3-bit counter. The address counter 37 performs a count up operation as shown in FIG. 14 every time the output signal from the AND circuit 24a rises to H level and provides the count value to a ROM (storage device) 38 as an address signal. As shown in FIG. 14, eight different combinations of clock adjustment signals sa1 to sa4 are pre-stored in the ROM 38 in accordance with the combinations of 3-bit address signals. In response to an address signal from the address counter 37, the ROM 38 provides the corresponding clock adjustment signals sa1 to sa4 to the clock adjustment circuits 13a to 13d.

With such a configuration, the clock adjustment signals sa1 to sa4 are switched in accordance with the count up operation of the address counter 37, and the count up operation is repeated until SSO noise is suppressed to a tolerable value or less.

In addition to the advantages of the first embodiment, the second embodiment has an advantage in that one of the eight different combinations of the clock adjustment signals sa1 to sa4 is selected in accordance with the count up operation of the address counter 37. This performs the adjustment operation more quickly to suppress SSO noise to a tolerable value or less.

FIG. 15 is a schematic block diagram showing a semiconductor device 300 for suppressing SSO noise according to a third embodiment of the present invention. An output circuit 320 of the third embodiment generates a plurality of output signals according to clock signals with different frequencies (i.e., in different clock ranges). The semiconductor device 300 includes three selector groups 43a, 43b, and 43c, three flip-flop circuit groups FFA1 to FFAn, FFB1 to FFBn, and FFC1 to FFCn, three clock adjustment circuits 41a, 41b, and 41c, three buffer circuit groups 44a, 44b, and 44c, a test pattern generation circuit 12, a timer circuit 15, a PLL circuit 16, two frequency dividing circuits 40a and 40b, three selectors 39a, 39b, and 39c, and a clock control circuit 18. The flip-flop circuit groups FFA1 to FFAn, FFB1 to FFBn, and FFC1 to FFCn and the buffer circuit groups 44a, 44b and 44c configure the output circuit 320. The selector groups 43a, 43b, and 43c and the clock adjustment circuits 41a, 41b, and 41c configure an SSO noise generation circuit 340.

A timer circuit 15 and a test pattern generation circuit 12 have the same configurations as those of the first embodiment. The test pattern generation circuit 12 provides a test clock signal TCLK to selectors 39a to 39c.

The selector 39a is provided with a main clock signal MCLKa from the PLL circuit 16, the selector 39b is provided with a main clock signal MCLKb generated by frequency-dividing the main clock signal MCLKa with a frequency dividing circuit 40a, and the selector 39c is provided with a main clock signal MCLKc generated by frequency-dividing the main clock signal MCLKb with a frequency dividing circuit 40b.

The selectors 39a to 39c are each provided with a test mode signal tm. When the test mode signal tm rises to H level during a test mode operation, the selectors 39a to 39c select a test clock signal TCLK and output the test clock signal TCLK as operation clock signals CLKA, CLKB, and CLKC, respectively. During normal mode, the selectors 39a to 39c select main clock signals MCLKa, MCLKb, and MCLKc, respectively, and output operation clock signals CLKA, CLKB, and CLKC, respectively.

The operation clock signals CLKA, CLKB, and CLKC are provided to clock adjustment circuits 41a, 41b, and 41c, respectively. The clock adjustment circuits 41a, 41b, and 41c are also provided with 3-bit clock adjustment signals sa, sb and sc, respectively, from a clock control circuit 42. The clock adjustment circuits 41a to 41c respectively generate clock signals CLKa to CLKc, the phases of which are adjusted according to the corresponding clock adjustment signals sa to sc. The configuration of each of the clock adjustment circuits 41a to 41c is similar to the clock adjustment circuit 13a shown in FIG. 10.

The clock signal CLKa is provided, as a clock signal, to the flip-flop circuit group FFA1 to FFAn operating in the first clock range. The flip-flop circuit group FFA1 to FFAn is provided with output signals of the selector group 43a. The selector group 43a is provided with output data da1 to dan from internal circuits and also provided with a test data signal td from the test pattern generation circuit 12.

The selector group 43a is provided with a test mode signal tm. When the test mode signal tm rises to H level during a test mode operation, the selector group 43a selects a test data signal td. During a normal mode, the selector group 43a selects output data da1 to dan.

The flip-flop circuit group FFA1 to FFAn generates output data DA1 to DAn transferred via the buffer circuit group 44a.

The clock signal CLKb is provided, as a clock signal, to the flip-flop circuit group FFB1 to FFBn operating in the second clock range. The flip-flop circuit group FFB1 to FFBn is provided with output signals of the selector group 43b. The selector group 43b is provided with output data db1 to dbn from internal circuits and with a test data signal td from the test pattern generation circuit 12.

The selector group 43b is provided with a test mode signal tm. When the test mode signal tm rises to H level during a test mode operation, the selector group 43b selects a test data signal td. During normal mode, the selector group 43b selects output data db1 to dbn.

The flip-flop circuit group FFB1 to FFBn generates output signals DB1 to DBn transferred via the buffer circuit group 44b.

The clock signal CLKc is provided, as a clock signal, to the flip-flop circuit group FFC1 to FFCn operating in the third clock range. The flip-flop circuit group FFC1 to FFCn is provided with output signals from the selector group 43c. The selector group 43c is provided with output data dc1 to dcn from internal circuits and also provided with a test data signal td from the test pattern generation circuit 12.

The selector group 43c is provided with a test mode signal tm. When the test mode signal tm rises to H level during a test mode operation, the selector group 43c selects a test data signal td. During normal mode, the selector group 43c selects output data dc1 to dcn.

The flip-flop circuit group FFC1 to FFCn generates output signals DC1 to DCn transferred via the buffer circuit group 44c.

The clock control circuit 42 will now be described with reference to FIG. 16. The clock control circuit 42 has a configuration similar to the clock control circuit 18 of the first embodiment shown in FIG. 4 except in that the clock control circuit 42 additionally includes a clock adjustment signal generator 20b having a 9-bit counter 45.

Figures 16, 17:
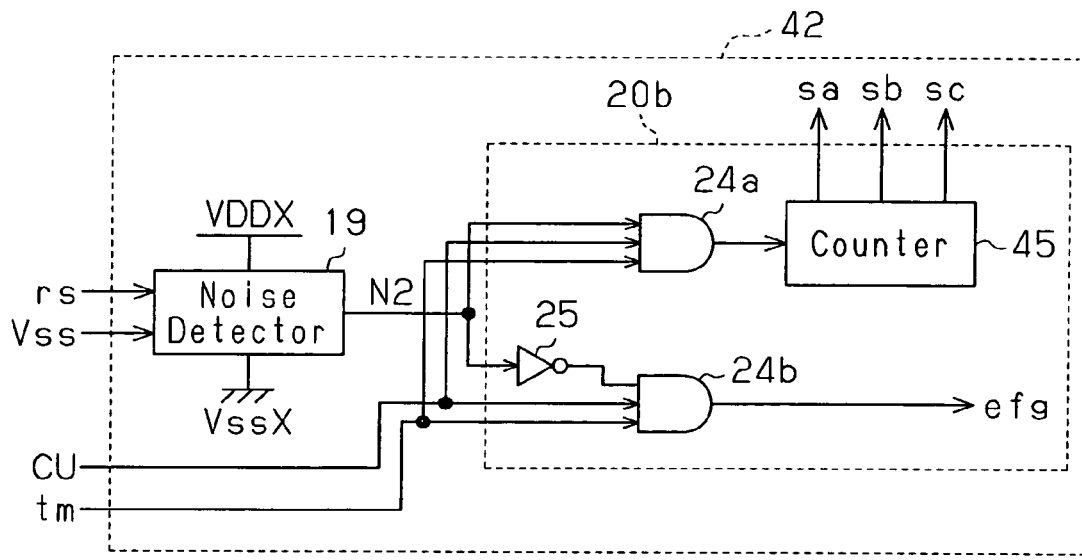
FIG. 16 is a schematic block diagram showing a clock control circuit of the semiconductor device in FIG. 15.
FIG. 17 is an explanatory diagram showing the operation of the counter of the clock control circuit in FIG. 16.

The counter 45 carries out a count up operation every time the output signal of an AND circuit 24a rises to H level and generates clock adjustment signals sa to sc, each configured by three bits as shown in FIG. 17. The phases of the clock signals CLKa to CLKc are varied by the change of the clock adjustment signals sa to sc according to the count up operation of the counter 45 in a manner similar to the first embodiment.

The semiconductor device 300 of the third embodiment operates similarly to the semiconductor device 200 of the first embodiment except in that the phases of the output data DA1 to DAn, DB1 to DBn, and DC1 to DCn are adjusted at the same time for each of the clock ranges according to the clock adjustment signals sa to sc provided to the clock adjustment circuits 41a to 41c during a test mode operation.

Accordingly, the semiconductor device 300 of the third embodiment has the same advantages as the semiconductor device 200 of the first embodiment. In addition, the semiconductor device 300 suppresses SSO noise when operating in different clock ranges.

In the third embodiment, the counter 45 may be replaced by an address counter 37 and a ROM 38 as shown in FIG. 13.

A semiconductor device according to a fourth embodiment of the present invention will now be described. In this embodiment, the phase adjustment operations of the clock signals of the semiconductor devices according to the first to third embodiments are incorporated in a power-up sequence.

Figure 18:
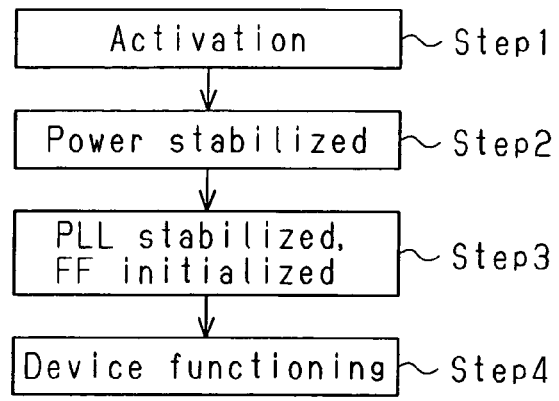
FIG. 18 is a flowchart showing a conventional example of a power-up sequence.

FIG. 18 illustrates a conventional power-up sequence. According to the conventional power-up sequence, the semiconductor device is activated (step 1), the power supply voltage is stabilized (step 2), the output signal frequency of the PLL circuit 16 is stabilized and the flip-flop circuits in the output stage are initialized (step 3), and then the normal mode operation of the semiconductor device is started (step 4).

Figure 19:
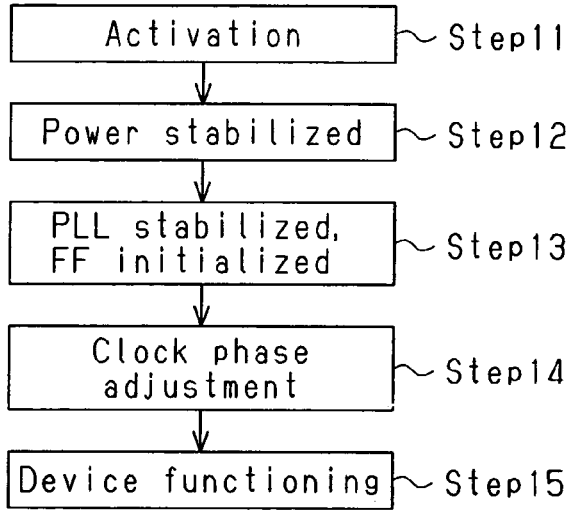
FIG. 19 is a flowchart showing a power-up sequence of a semiconductor device according to a fourth embodiment of the present invention.

In contrast, according to the power-up sequence in the semiconductor device of the fourth embodiment, as shown in FIG. 19, the semiconductor device is activated (step 11), the power supply voltage is stabilized (step 12), the output signal frequency of the PLL circuit 16 is stabilized and the flip-flop circuits in the output stage are initialized (step 13), and then phase adjustment operation is performed on the clock signals (step 14).

A time period required from the start of supplying power to the completion of stabilization of the output signal frequency of the PLL circuit 16 and of initialization of the flip-flop circuit is set in the timer circuit 15 in advance, so that timer circuit 15 provides an adjustment start flag sfg to the test pattern generation circuit 12 after the set time period has elapsed.

The phase adjustment of the clock signals in the embodiments described above is carried out according to the operation of the test pattern generation circuit 12. When SSO noise is suppressed to the tolerable value or less, the test pattern generation circuit 12 stops its operation in response to the adjustment end flag efg from the clock control circuits 18 and 42. Then, the semiconductor device starts normal mode operation (step 15).

Thus, according to the fourth embodiment, SSO noise is automatically suppressed to the tolerable value or less by the power-up sequence prior to activation of the semiconductor device.

Figure 20:
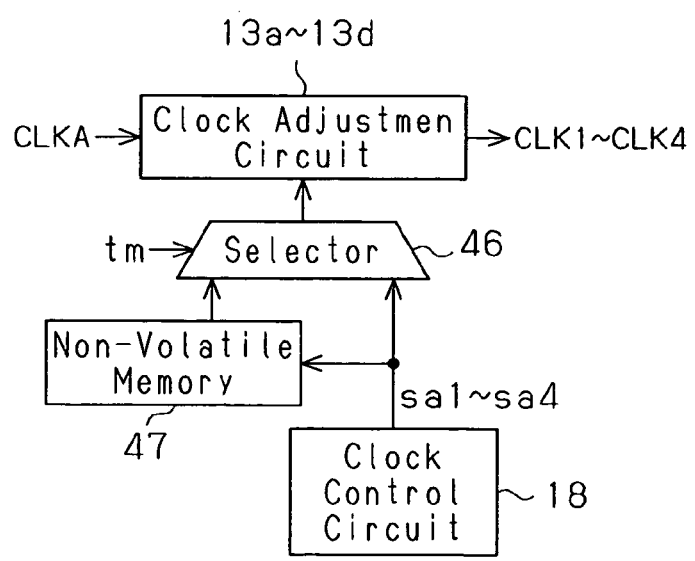
FIG. 20 is a schematic block diagram showing principal parts of a semiconductor device according to a fifth embodiment of the present invention.

FIG. 20 is a schematic block diagram showing principal parts of a semiconductor device according to a fifth embodiment of the present invention. The semiconductor device of the fifth embodiment has a non-volatile memory 47 serving as a storing means for storing clock adjustment signals sa1 to sa4, which are, for example, count values of the counter 26 in the clock control circuit 18 of the first embodiment.

The clock adjustment signals sa1 to sa4 are provided to a selector 46 and the non-volatile memory 47 from a clock control circuit 18 (clock adjustment signal generator 20). The non-volatile memory 47 stores the clock adjustment signals sa1 to sa4 and provides the stored clock adjustment signals sa1 to sa4 to the selector 46.

The selector 46 is provided with a test mode signal tm. When the test mode signal tm rises to H level during a test mode, the selector 46 selects the clock adjustment signals sa1 to sa4 from the clock control circuit 18 and provides the clock adjustment signals sa1 to sa4 to clock adjustment circuits 13a to 13d.

When the test mode signal tm drops to L level during a normal mode, the selector 46 selects the clock adjustment signals sa1 to sa4 from the non-volatile memory 47 and provides the clock adjustment signals sa1 to sa4 to the clock adjustment circuits 13a to 13d.

Figure 21:
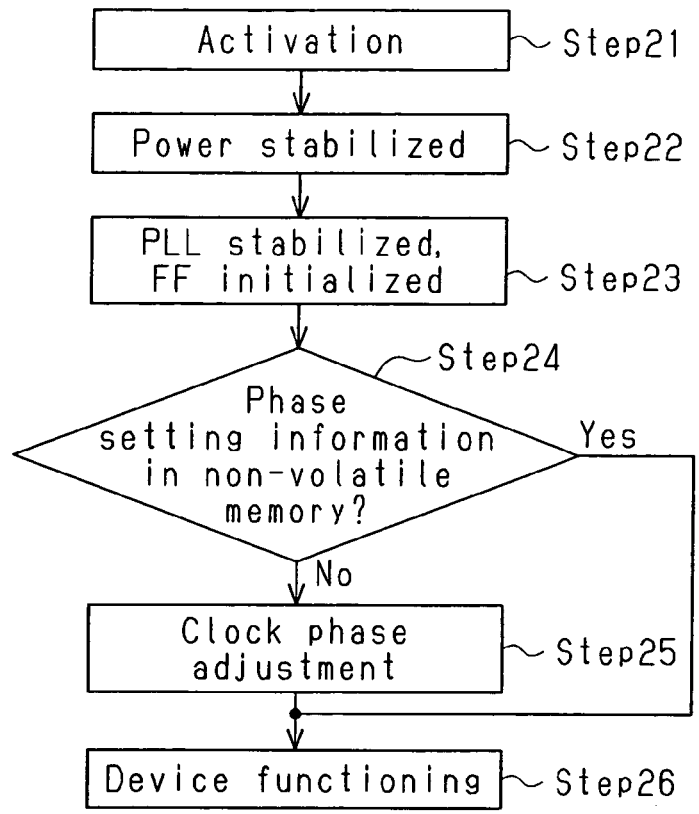
FIG. 21 is a flowchart showing a power-up sequence of the semiconductor device having an output circuit in FIG. 20.

The power-up sequence of the semiconductor device incorporating the non-volatile memory 47 will be described with reference to FIG. 21. First, the semiconductor device is activated (step 21). Then, the power. supply voltage is stabilized (step 22), the output signal frequency of the PLL circuit 16 is stabilized and the flip-flop circuits in the output stage are initialized (step 23). Subsequently, it is determined whether the clock adjustment signals sa1 to sa4 are stored in the non-volatile memory 47 (step 24).

If the clock adjustment signals sa1 to sa4 are not stored in the non-volatile memory 47 (i.e., when the output circuit is activated for the first time), the semiconductor device causes the output circuit to adjust the phase of the clock signals (step 25) and then starts functioning (step 26).

If the clock adjustment signals sa1 to sa4 are stored in the non-volatile memory 47 (i.e., when the output circuit is activated for the second time or afterwards), the semiconductor device starts functioning (step 26). In this case, the phase adjustment of the clock signals (step 25) is not performed.

Since the phase adjustment of the clock signals is performed only when the output circuit is activated for the first time, the semiconductor device incorporating the output circuit is quickly activated. This reduces the power consumed by the phase adjustment operation. Furthermore, due to the employment of the non-volatile memory 47, the counter 26 does not have to be kept on to hold the clock adjustment signals sa1 to sa4. This further reduces power consumption.

Figure 22:
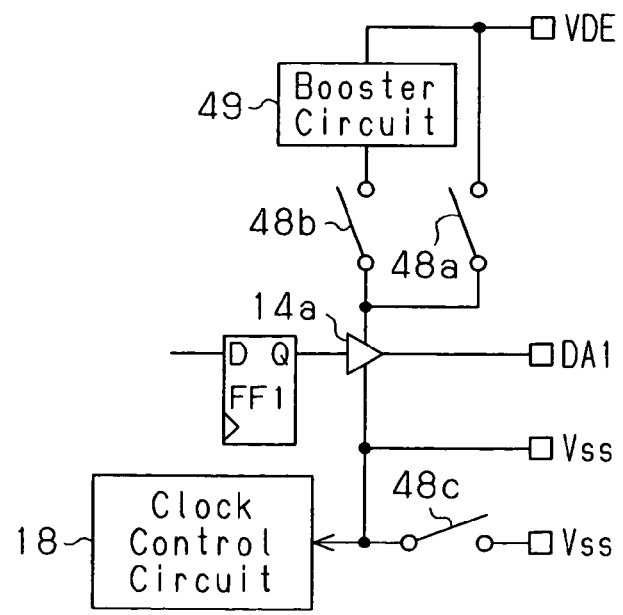
FIG. 22 is a schematic block diagram showing principal parts of a semiconductor device according to a sixth embodiment of the present invention.

FIG. 22 is a schematic block diagram showing principal parts of a semiconductor device according to a sixth embodiment of the present invention. The semiconductor device according to the sixth embodiment has a configuration for improving the accuracy of detecting SSO noise during a phase adjustment operation for clock signals in the embodiments described above. The semiconductor device of the sixth embodiment includes switch circuits 48a, 48b, and 48c and a booster circuit 49 in addition to the configuration of the semiconductor device 200 of the first embodiment.

The buffer circuit 14a of the first embodiment is connected to a high potential power supply VDE via the switch circuit 48a and to the booster circuit 49 via the switch circuit 48b. The booster circuit 49 boosts the voltage of the high potential power supply VDE and provides the boosted voltage to the buffer circuit 14a via the switch circuit 48b.

The buffer circuit 14a is connected to a low potential power supply Vss via a plurality of pads. One of the plurality of pads is connected to the buffer circuit 14a via the switch circuit 48c. The power supply Vss is supplied to the control circuit 18 from a pad that is not connected to the switch circuit 48c.

The switch circuits 48a and 48c are turned off during a clock signal adjustment operation and turned on during normal mode. The switch circuit 48b is turned on during clock signal adjustment operation and turned off during normal mode. Consequently, during a clock signal adjustment operation, the buffer circuit 14a is provided with boosted power from the booster circuit 49 and the number of power supply lines between the power supply Vss and the buffer circuit 14a is reduced. Each of the buffer circuits 14b to 14d is also provided with a switch circuit and a booster circuit in the same manner.

In such a configuration, the buffer circuits 14a to 14d are provided, during a clock signal adjustment operation, with higher voltage than the ordinary voltage of the high potential power supply VDE by turning the switch circuit 48b on. Thus, the SSO noise is substantially amplified. Also, by turning the switch circuit 48c off, the number of the power supply lines between the buffer circuits 14a to 14d and the power supply Vss is reduced. Thus, the inductance between the buffer circuits 14a to 14d and the power supply Vss is increased, and the chance of generating SSO noise is increased.

Accordingly, SSO noise produced instantaneously during a clock signal adjustment operation is easily detected. Thus, the clock signal is reliably adjusted.

It should be apparent to those skilled in the art that the present invention may be embodied in many other specific forms without departing from the spirit or scope of the invention. Particularly, it should be understood that the invention may be embodied in the following forms.

In the embodiments described above, the clock adjustment signal may be configured by a larger number of bits so that the clock signal provided to the flip-flop circuit is adjusted more accurately.

In the embodiments described above, the clock adjustment signal may be configured by less than two bits so as to shorten the time required for setting a clock signal for suppressing SSO noise to a tolerable value or less.

The clock control circuits 18 and 42 may be connected to the exclusive power supply VssX at least when it is a low potential power supply.

The present invention may be applied not only for suppressing SSO noise produced at a low potential power supply, but also for suppressing SSO noise produced at a high potential power supply.

The present examples and embodiments are to be considered as illustrative and not restrictive, and the invention is not to be limited to the details given herein, but may be modified within the scope and equivalence of the appended claims.

What is claimed is:

1. A semiconductor device comprising:
    an output circuit for outputting a plurality of output signals in parallel in accordance with a clock signal;
    a noise generation circuit, connected to the output circuit, for activating the output circuit to generate noise using the clock signal and a test signal in a test mode; and
    a clock control circuit for detecting the noise, wherein the clock control circuit generates a clock adjustment signal for adjusting a phase of the clock signal so as to suppress the noise.

2. The semiconductor device according to claim 1, wherein the output circuit includes:
    a plurality of flip-flop circuits for generating a plurality of output signals according to the clock signal, respectively; and
    a plurality of buffer circuits, connected to the plurality of flip-flop circuits, for receiving the output signals from the flip-flop circuits and outputting the received output signals, respectively; and
    wherein the noise generation circuit includes:
    a plurality of selectors, connected to the plurality of flip-flop circuits, for selectively providing the output signals and the test signal to the flip-flop circuits, respectively in response to a test mode signal; and
    a clock adjustment circuit, connected to the flip-flop circuits, for adjusting the phase of the clock signal and providing the phase-adjusted clock signal to the flip-flop circuits.

3. The semiconductor device according to claim 2, wherein the clock adjustment circuit includes:
    a clock signal generator for generating a plurality of internal clock signals having different phases; and
    a clock signal selecting unit, connected to the clock signal generator, for selecting one of the internal clock signals in accordance with the clock adjustment signal and generating an adjusted clock signal.

4. The semiconductor device according to claim 2, wherein the clock adjustment circuit includes a plurality of clock adjustment circuits connected to the plurality of flip-flop circuits, wherein each of the clock adjustment circuits adjusts the phase of the clock signal and provides the adjusted clock signal to an associated one of the flip-flop circuits.

5. The semiconductor device according to claim 1, wherein the buffer circuits are each connected to a low potential power supply voltage via a plurality of power supply lines, the semiconductor device further comprising:

at least either one of a booster circuit, for supplying a boosted voltage to each of the buffer circuits when the noise generation circuit and the clock control circuit are functioning, and a switch circuit, for reducing the number of the power supply lines when the noise generation circuit and the clock control circuit are functioning.

6. The semiconductor device according to claim 2, wherein the buffer circuits are connected to a low potential power supply voltage, the clock control circuit including:

a noise detector for generating a detection signal when a voltage of the low potential power supply is equal to or greater than a tolerable value; and a clock adjustment signal generator, connected to the noise detector, for generating the clock adjustment signal in accordance with the detection signal and for providing the clock adjustment signal to the clock adjustment circuit.

7. The semiconductor device according to claim 6, wherein the noise detector repeats the noise detecting operation synchronously with the clock signal, and the clock adjustment signal generator counts the number of times the detection signal is generated and generates the clock adjustment signal according to the count.

8. The semiconductor device according to claim 6, wherein the clock adjustment signal generator includes a counter for counting the number of the detection signal and providing a count value to the clock adjustment circuit as the clock adjustment signal.

9. The semiconductor device according to claim 6, wherein the clock adjustment signal generator includes:

a counter for counting the number of times the detection signal is generated; and a storage device, connected to the counter, for storing the clock adjustment signal at an address corresponding to the count value of the counter.

10. The semiconductor device according to claim 6, further comprising:

a non-volatile memory, connected to the clock adjustment signal generator, for storing the clock adjustment signal that is provided to the clock adjustment circuit.

11. The semiconductor device according to claim 6, wherein the noise detector is connected to a low potential power supply used exclusively for the noise detector, and the noise detector detects noise based on a difference between the potential at the exclusive low potential power supply and the potential at the low potential power supply connected to the buffer circuit.

12. The semiconductor device according to claim 1, further comprising:

a test pattern generation circuit, connected to the clock control circuit, for activating the clock control circuit during a power-up sequence of the semiconductor device.

13. The semiconductor device according to claim 1, wherein the output circuit includes:

a plurality of flip-flop circuit groups generating a plurality of output signals in accordance with the clock signal, respectively; and a plurality of buffer circuit groups, connected to the plurality of flip-flop circuit groups, for receiving the output signals of the flip-flop circuit groups and outputting the received output signals, respectively; and the noise generation circuit includes:

a plurality of selector groups, connected to the plurality of flip-flop circuit groups, for selectively providing selector output signals and the test signal to the flip-flop circuit groups, respectively in response to a test mode signal; and a plurality of clock adjustment circuits, connected to the plurality of flip-flop circuit groups, for adjusting the phase of the clock signal and providing the plurality of flip-flop circuit groups with a plurality of adjusted clock signals, respectively.

14. A semiconductor device comprising:

an output circuit for outputting a plurality of output signals in parallel in accordance with a clock signal, wherein the output circuit is activated to generate noise using the clock signal and a test signal in a test mode; and a clock control circuit, connected to the output circuit, for detecting noise generated due to operation of the output circuit using the clock signal and the test signal in the test mode and adjusting phase of the clock signal so as to suppress the noise.

15. A semiconductor device comprising:

a plurality of flip-flop circuits for generating a plurality of output signals in accordance with a plurality of clock signals, respectively;

a plurality of buffer circuits, connected to the plurality of flip-flop circuits, for receiving the output signals from the flip-flop circuits and outputting the output signals, respectively;

a plurality of selectors, connected to the plurality of flip-flop circuits, for selectively supplying the flip-flop circuits with selector output signals and a test signal, respectively in response to a test mode signal, wherein noise is produced when the buffer circuits function by receiving the output signals from the flip-flop circuits based on the test signal;

a plurality of clock adjustment circuits connected to the plurality of flip-flop circuits, wherein each of the clock adjustment circuits adjusts phase of the corresponding clock signal in accordance with an adjustment signal and providing the adjusted clock signal to an associated one of the flip-flop circuits; and a clock control circuit connected to the clock adjustment circuits for detecting the noise, generating a clock adjustment signal for adjusting the phase of the clock signals to suppress the noise, and providing the clock adjustment signal to the clock adjustment circuits.

16. The semiconductor device according to claim 15, wherein the buffer circuits are connected to a low potential power supply, the clock control circuit including:

a noise detector for generating a detection signal when voltage of the low potential power supply is equal to or greater than a tolerable value; and a clock adjustment signal generator, connected to the noise detector, for generating a clock adjustment signal for adjusting the phase of the clock signals in accordance with the detection signal and providing the clock adjustment signal to the clock adjustment circuits.

17. The semiconductor device according to claim 16, wherein the clock adjustment signal generator includes a counter for counting the detection signal and providing the plurality of clock adjustment circuits with the count value as the clock adjustment signal.

18. The semiconductor device according to claim 16, wherein the clock adjustment signal generator includes:

a counter for counting the number of times the detection signal is generated; and a storage device, connected to the counter, for storing the clock adjustment signal at an address corresponding to the count value of the counter.

19. The semiconductor device according to claim 16, wherein the noise detector is connected to a low potential power supply used exclusively for the noise detector.

* * * * *